(12) United States Patent
Motoyoshi et al.

(10) Patent No.: US 7,623,666 B2
(45) Date of Patent: Nov. 24, 2009

(54) AUTOMATIC SETTING OF SECURITY IN COMMUNICATION NETWORK SYSTEM

(75) Inventors: Shinichiro Motoyoshi, Tokyo (JP);
Hiroshi Kitamura, Tokyo (JP);
Masataka Nagura, Tokyo (JP);
Kazuhiko Harasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 727 days.

(21) Appl. No.: 10/890,301

(22) Filed: Jul. 14, 2004

(65) Prior Publication Data
US 2005/0028011 A1 Feb. 3, 2005

(30) Foreign Application Priority Data
Jul. 28, 2003 (JP) .............................. 2003-280589

(51) Int. Cl.
*H04K 1/00* (2006.01)
(52) U.S. Cl. .............................. 380/270; 726/4; 726/18; 380/247; 380/248; 455/410; 455/411
(58) Field of Classification Search ................. 380/270, 380/247, 248, 249, 250; 709/223; 726/4, 726/15, 18, 21
See application file for complete search history.

(56) References Cited

U.S. PATENT DOCUMENTS

| | | | |
|---|---|---|---|
| 6,138,121 A * | 10/2000 | Costa et al. ................. | 707/100 |
| 6,745,333 B1 * | 6/2004 | Thomsen ..................... | 726/23 |
| 6,889,328 B1 * | 5/2005 | Herrero et al. .................. | 726/3 |
| 7,065,356 B2 * | 6/2006 | Lin et al. ................. | 455/432.1 |
| 7,150,044 B2 * | 12/2006 | Hoefelmeyer et al. ......... | 726/23 |
| 7,222,359 B2 * | 5/2007 | Freund et al. .................. | 726/3 |
| 2003/0097590 A1 * | 5/2003 | Syvanne ..................... | 713/201 |
| 2003/0167405 A1 * | 9/2003 | Freund et al. ............... | 713/201 |
| 2004/0198220 A1 * | 10/2004 | Whelan et al. ............. | 455/41.1 |

(Continued)

FOREIGN PATENT DOCUMENTS

JP 4-274636 9/1992

(Continued)

OTHER PUBLICATIONS

Japanese Patent Office issued a Japanese Office Action on Jan. 5, 2009, Application No. 2003-280589.

*Primary Examiner*—Kimyen Vu
*Assistant Examiner*—April Y Shan
(74) *Attorney, Agent, or Firm*—Young & Thompson

(57) ABSTRACT

A communication network system has a plurality of interconnected sub-networks, at least one mobile node having a care-of address dependent on a sub-network currently connected thereto and a home address independent of the connected sub-network, and a home agent. Upon detection of a sub-network connected to the mobile node, the latter determines a security method corresponding to the sub-network held in a node-side security application management table as a security method for ensuring the security for user data communicated between the mobile node and a home agent associated therewith. Then, the sub-network is notified to the home agent through a mobile node network signal. The home agent determines a security method corresponding to the sub-network from among security methods held in an agent-side security application management table as a security method used for ensuring the security for user data communicated between the home agent and the mobile node managed thereby.

3 Claims, 5 Drawing Sheets

U.S. PATENT DOCUMENTS

| | | | |
|---|---|---|---|
| 2004/0198319 A1* | 10/2004 | Whelan et al. | 455/411 |
| 2004/0213172 A1* | 10/2004 | Myers et al. | 370/313 |
| 2005/0164704 A1* | 7/2005 | Winsor | 455/432.3 |
| 2007/0006295 A1* | 1/2007 | Haverinen et al. | 726/14 |

FOREIGN PATENT DOCUMENTS

| | | |
|---|---|---|
| JP | 2000-22681 | 1/2000 |
| JP | 2000-31957 | 1/2000 |
| JP | 2000022681 A * | 1/2000 |
| JP | 3050843 | 3/2000 |
| JP | 2000-244547 | 9/2000 |
| JP | 2000-244547 A * | 9/2000 |
| JP | 2001-339382 | 12/2001 |
| JP | 2001339382 A * | 12/2001 |

* cited by examiner

AUTOMATIC SETTING OF SECURITY IN COMMUNICATION NETWORK SYSTEM

BACKGROUND OF THE INVENTION

1. Field of the Invention

The present invention relates to a communication network for which security measures are taken to prevent fraudulent acts, and an automatic security setting method.

2. Description of the Related Art

JP-4-274636-A describes an example of a communication network system for which security measures are taken to prevent fraudulent acts. This prior art system comprises, between a network line controller connected to a transmission path and a computer, a destination identification unit for determining whether or not encryption is required on a destination-by-destination basis with reference to an encryption specifying table; a data encryption unit for reading an encryption method from an external storage device to encrypt transmission data; an encrypted data decryption unit for reading a decryption method from the external storage device to decrypt encrypted data; a source identification unit for identifying the source of received data, and determining whether or not decryption is required with reference to the encryption specifying table; and an encryption method control unit for registering and modifying encryption methods. With the foregoing configuration, the communication network system can encrypt data transferred between arbitrarily specified computers, and can also readily modify the encryption method used therefor.

JP-2000-31957-A describes another example of a communication network system for which security measures are taken to prevent fraudulent acts. In this prior art system, for communicating an electronic mail between a pair of nodes through a transmission server and a reception server, the transmission server has encryption means for encrypting electronic mail data transmitted from a transmission node in accordance with a predetermined encryption scheme and transmitting the encrypted electronic mail data, while the reception server has decryption means for decrypting the received encrypted data and transferring the decrypted data to a reception node. This prior art system can individually set a predetermined encryption scheme for each of node pairs, and can arbitrarily change the settings.

Another example of a communication network system for which security measures are taken to prevent fraudulent acts is a network system conforming to an IPv6 protocol. In IPv6, security functions such as encryption, authentication, and the like are incorporated in the protocol itself to enhance the security capability which termed been a weak point of IPv4. The security functions used in IPv6 are called IP Security (Internet Security) which includes ESP (Encapsulated Security Payload) based encryption, AH (Authentication Header) based authentication, and the like. These ESP-based encryption and AH-based authentication can be selected by a user from those provided by installation. Encryption algorithms available in ESP include DES, 3DES, AES, RC5, IDEA, and the like. When encryption is not utilized in ESP, a NULL encryption algorithm is selected. In both AH and ESP, MD5 and SHA1 are available for the authentication algorithm, and can be selected by the user for use. For changing a utilized encryption algorithm and/or authentication algorithm, the setting must be manually changed.

Since the security functions such as encryption and authentication are techniques for preventing fraudulent acts by third parties such as tapping, tampering and the like, the security functions are not required for communications which utilize only reliable networks (for example, an intra-network, and the like) inherently free from the possibility of such fraudulent acts, so that the security functions, if utilized in such a secure environment, will adversely affect the communications to cause a lower communication efficiency and the like. On the other hand, the security functions are indispensable for communications through open networks such as the Internet which can be freely accessed by anyone. While conventional communication network systems can control whether or not encryption and/or authentication are required for each destination, they cannot control whether or not encryption and/or authentication are required in accordance with a sub-network to which even the same communication party is connected. Therefore, in a communication network system conforming to the IPv6 protocol which handles mobile nodes (mobile terminals) such as portable information terminals which is frequently roaming to cause a change in connection from one sub-network to another, there exists a need for techniques for automatically setting an appropriate security method in accordance with a sub-network to which a mobile node is connected.

SUMMARY OF THE INVENTION

It is an object of the present invention to provide an automatic security setting method which is capable of automatically setting a security method in accordance with a sub-network to which a mobile node is connected.

It is another object of the present invention to provide a mobile node and a home agent which implement the automatic security setting method.

The present invention is directed to a communication network system which has a plurality of sub-networks interconnected to one another, at least one mobile node having a care-of address dependent on a sub-network currently connected thereto and a home address independent of the connected sub-network, and a home agent.

In the present invention, a security application management table to hold therein correspondences between sub-networks and security methods is provided in the mobile node or in the mobile node and home agent, such that when the mobile node is connected to a different sub-network, a method for ensuring the security for user data communicated between the mobile node and home agent is automatically set based on the security application management table.

Specifically, in a first aspect of the present invention, the mobile node first detects a sub-network to which the mobile node itself is connected. Next, the mobile node determines a security method corresponding to the sub-network from among security methods held in a node-side security application management table as a security method used for ensuring the security for user data communicated between the mobile node and the home agent associated therewith. Then, the mobile node notifies the sub-network to the home agent through a mobile node network signal. The home agent determines a security method corresponding to the sub-network from among security methods held in an agent-side security application management table to hold therein correspondences between sub-networks connected to the mobile node managed thereby and security methods, as a security method used to ensure the security for user data communicated between the home agent and the mobile node managed thereby.

In a second aspect of the present invention, the security application management table is provided only in the mobile node, and the mobile node notifies the home agent of a determined security method through a mobile node network signal. The home agent determines the security method notified from the mobile node through the mobile node network signal as a security method for user data communicated between the home agent and the mobile node managed thereby.

In this way, according to the present invention, a method for ensuring the security for user data communicated between a mobile node and a home agent associated therewith is automatically switched in accordance with a sub-network to which the mobile node is connected.

The above and other objects, features and advantages of the present invention will become apparent from the following description with reference to the accompanying drawings which illustrate examples of the present invention.

DETAILED DESCRIPTION OF THE PREFERRED EMBODIMENT

First Embodiment

Figure 1:
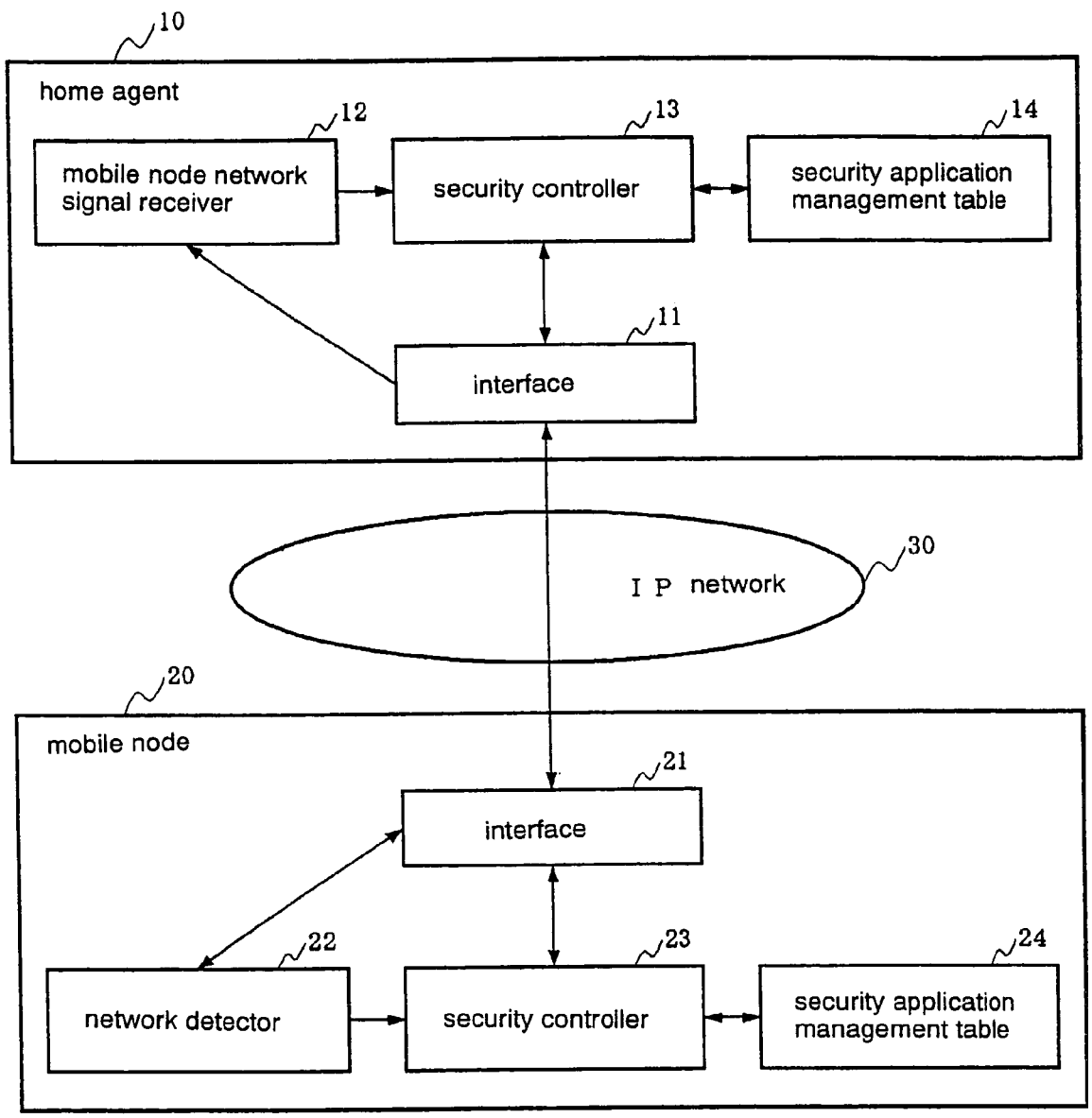
FIG. 1 is a block diagram illustrating a communication network system according to a first embodiment of the present invention.

Referring to FIG. 1, a communication network system according to a first embodiment of the present invention has mobile node 20 and associated home agent 10 which are interconnected through IP network 30.

IP network 30 which connects mobile node 20 to associated home agent 10 changes in response to movements of mobile node 20. For example, when mobile node 20 is connected to a home link, IP network 30 corresponds to the home link. When mobile node 20 has moved to a certain foreign link, IP network 30 corresponds to one or a plurality of networks situated between the home link and the foreign link such as the Internet and the like.

Mobile node 20 has interface 21 physically connected to IP network 30. Network detector 22 detects a network to which the mobile node 20 itself is connected through interface 21, communicates the information to security controller 23, and sends the information to mobile node network signal receiver 12 of home agent 10 through interface 21 as a mobile node network notification signal. The mobile node network notification signal may be a dedicated signal newly defined therefor, or a Binding Update signal of the mobile IPv6 standard, which is a message signal for notifying home agent 10 that the mobile node has moved to a different network. Security controller 23 matches the received network information with previously created security application management table 24 to determine a security method for use with home agent 10.

Home agent 10, which is a home agent associated with mobile node 20, has interface 11 physically connected to IP network 30. The mobile node network notification signal sent from mobile node 20 is received by mobile node network signal receiver 12, and sent to security controller 13. Security controller 13 matches the received information with previously created security application management table 14 to determine a security method for use with mobile node 20.

Figure 2:
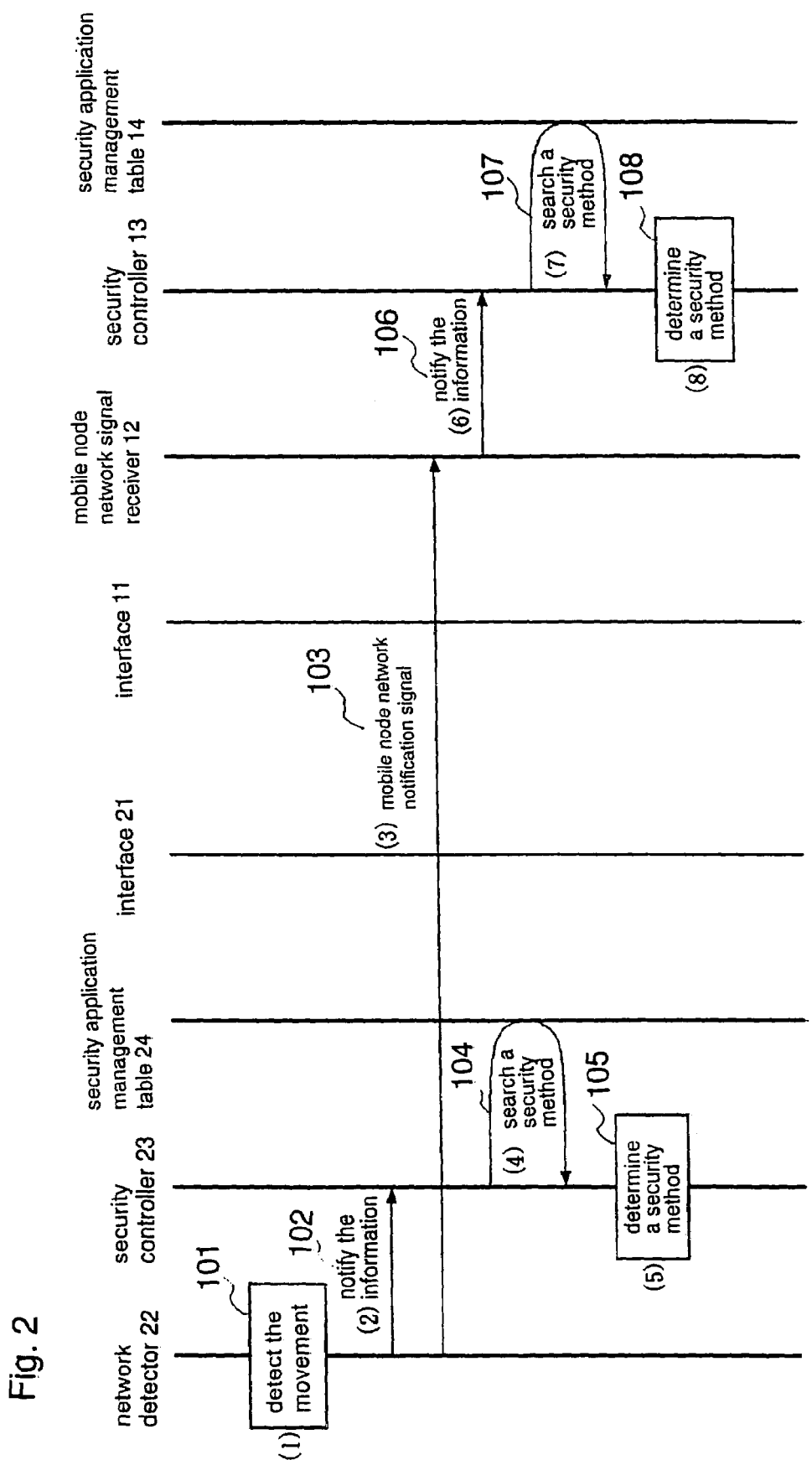
FIG. 2 is a sequence chart representing an exemplary operation of the communication network system according to the first embodiment of the present invention.

Next, the operation of mobile node 20 in FIG. 1 will be described with reference to FIG. 2.

As mobile node 20 moves to a different network, network connector 22 identifies a network address of the network to which mobile node 20 itself is connected (step 101), sends the information to security controller 23 of associated mobile node 20 (step 102), and sends the information to mobile node network signal receiver 12 of home agent 10 through a mobile node network notification signal (step 103). Security controller 23 searches security application management table 24 using the network address as a key (step 104) to determine a security method for use in communication of user data with home agent 10 (step 105). Specifically, security controller 23 determines whether or not encryption is required, whether or not authentication is required, which method should be used when encryption is required, and which method should be used when authentication is required.

Figures 3, 4:
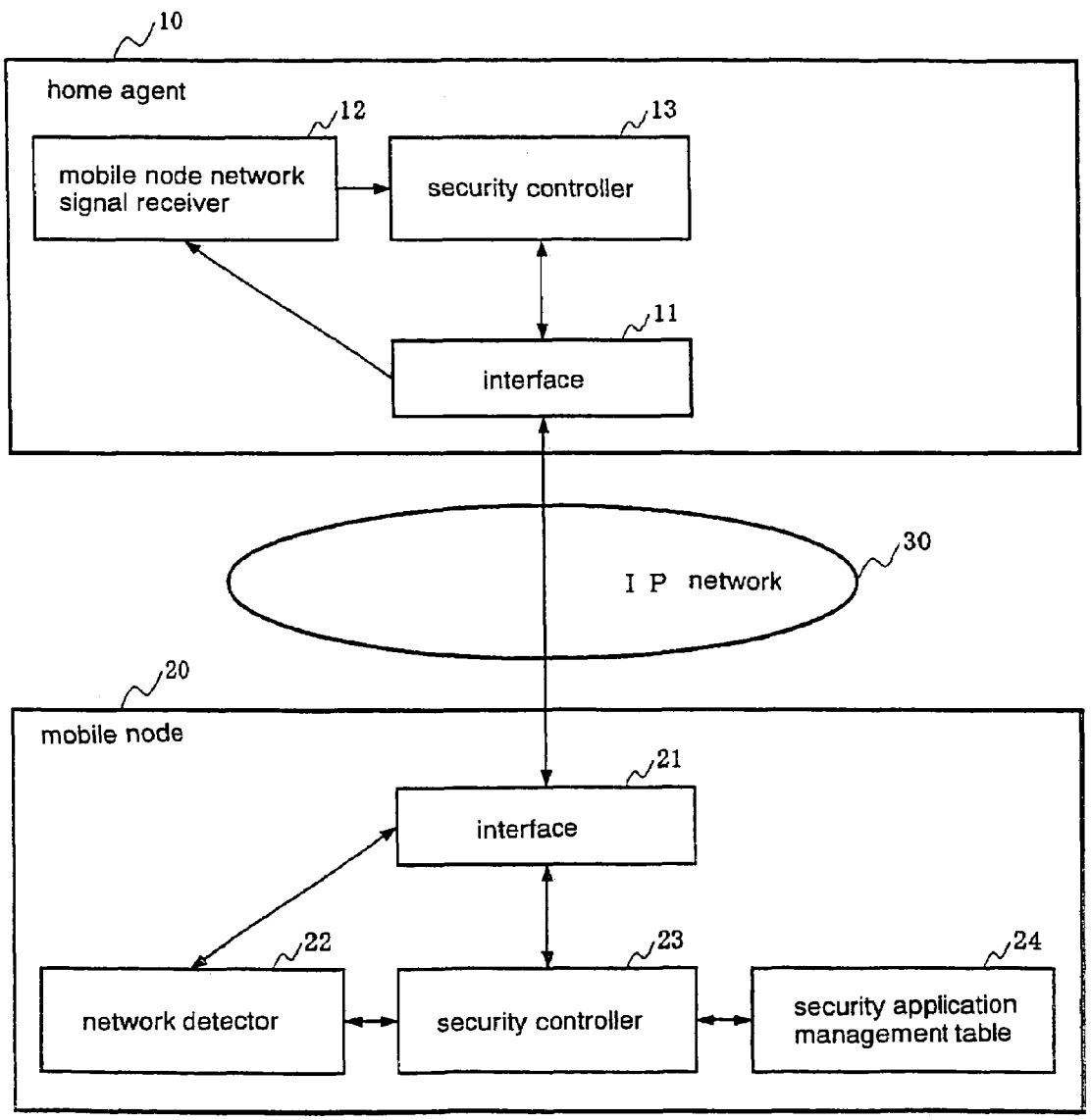
FIG. 3 shows an exemplary security application management table.
FIG. 4 is a block diagram illustrating a communication network system according to a second embodiment of the present invention.

FIG. 3 shows an example of security application management table 24. With this security application management table 24, when mobile node 20 belongs to a network having network address A, communications are made using an encryption scheme referred to as "ESP" (Encapsulating Security Payload. See RFC2306) for encrypting IP packets. Similarly, when mobile node 20 belongs to a network having network address B, communications are made using an authentication scheme referred to as "AH" (Authentication Header. See RFC2402) for preventing tampering of data within packets. When mobile node 20 belongs to a network having network address C, communications are made in plane text without encryption or authentication. Assume that an encryption algorithm utilized in ESP, and an authentication algorithm used in AH have been determined beforehand.

Next, the operation of home agent 10 will be described with reference to FIG. 2.

Upon receipt of a mobile node network notification signal from mobile node 20 at mobile node network signal receiver 12 (step 103), home agent 10 sends the network address of a network, to which mobile node 20 belongs, notified through the mobile node network notification signal, to security controller 13 (step 106). Security controller 13 searches security application management table 14 using the network address sent from mobile node 20 as a key (step 107) to determine a security method for use in communications of user data with mobile node 20 (step 108). Specifically, security controller 13 determines whether or not encryption is required, whether or not authentication is required, which method should be used when encryption is required, and which method should be used when authentication is required. Here, since the same contents are set in security application management table 14 of home agent 10 and in security application management table 24 of mobile node 20, a security method determined by security controller 13 is the same as a security method determined by security controller 23.

As described above, the communication network system according to this embodiment has advantages as described below.

First, since an appropriate security method is automatically set and reset in accordance with a network connected to a mobile node to eliminate unnecessary encrypted communications and the like, network resources can be effectively utilized.

Second, the elimination of manual security setting can save time and labor.

Third, the elimination of manual security setting will prevent erroneous settings, once the setting is made.

Fourth, since the security setting can be rapidly changed by virtue of the automation, running application software will not be interrupted even during a movement between networks which can entail a change in security scheme.

Second Embodiment

Figure 5:
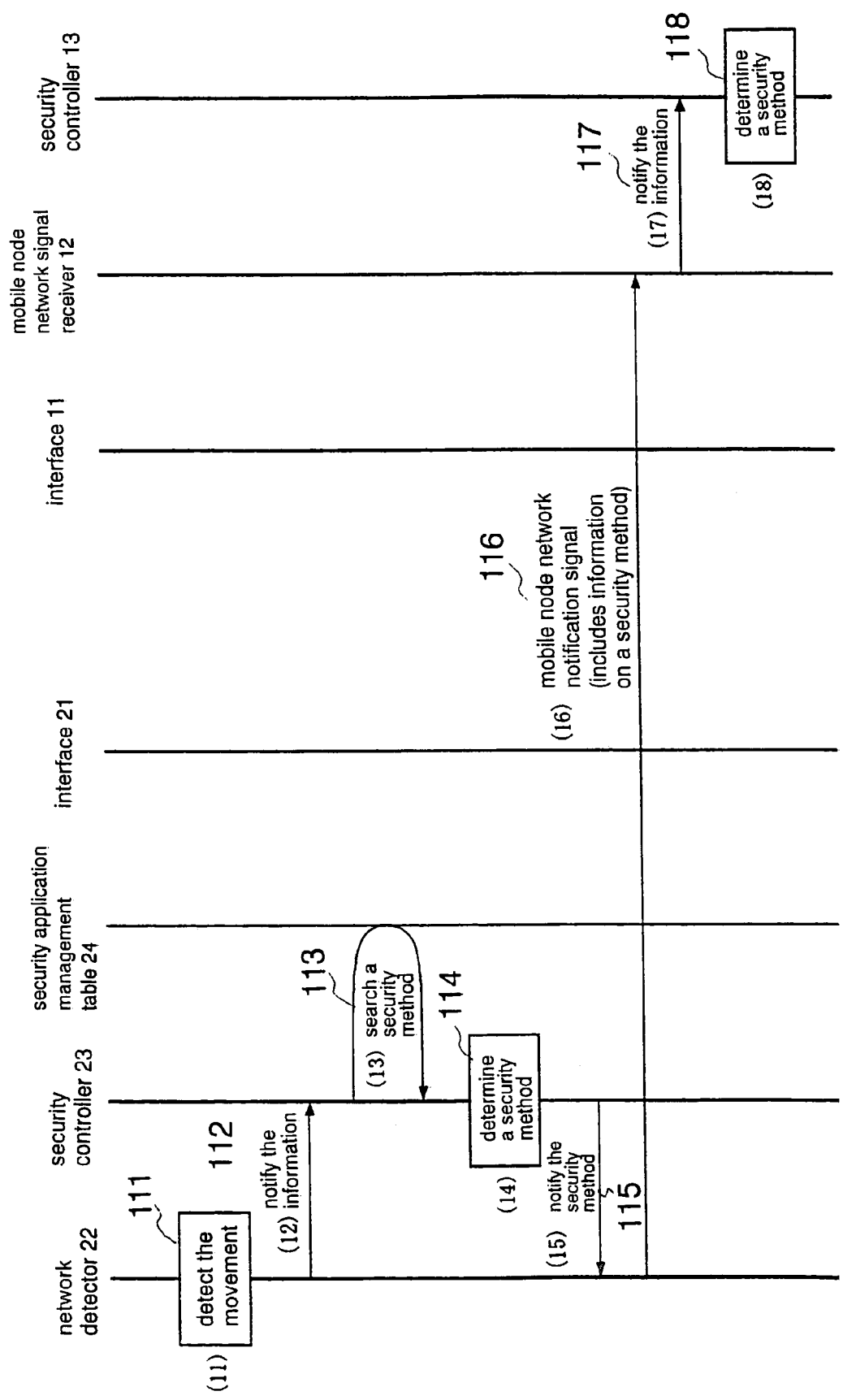
FIG. 5 is a sequence chart representing an exemplary operation of the communication network system according to the second embodiment of the present invention.

While a second embodiment of the present invention is substantially the same as the first embodiment in basic configuration, further ideas are incorporated in the security setting in home agent 10. FIG. 4 illustrates the configuration of a communication network system according to the second embodiment of the present invention. As shown in FIG. 4, home agent 10 in the second embodiment does not have security application management table 14, unlike home agent 10 in FIG. 1. FIG. 5 represents a sequence of operations performed in the configuration illustrated in FIG. 4. In this case, as mobile node 20 moves to a different network, network detector 22 identifies the network address of a network connected to associated mobile node 20 (step 111), and sends the information to security controller 23 (step 112). Security controller 2 searches security application management table 24 using the network address as a key (step 113) to determine a security method for use in communications of user data with home agent 10 (step 114). Specifically, security controller 23 determines whether or not encryption is required, whether or not authentication is required, which method should be used when encryption is required, and which method should be used when authentication is required.

Next, security controller 23 communicates information on the determined security method to network detector 22 (step 115). Network detector 22 sends the information on the security method, communicated thereto, to mobile node network signal receiver 12 of home agent 10, as carried by a mobile node network notification signal (step 116). The second embodiment differs from the first embodiment in that the mobile node network notification signal additionally includes information as to which security method is used. The mobile node network notification signal received by mobile node network signal receiver 12 is sent to security controller 13 (step 117). Since the mobile node network signal contains the information on the security method as mentioned above, security controller 13 determines a security method for use in communications of user data with mobile node 20 based on the mobile node network signal (step 118).

As described above, according to the second embodiment, since a single security application management table is involved in determining a security method, no security application management table need be set in home agent 10. Also, the communication network system can prevent disabled communications due to erroneous settings in the security application management tables separately held in home agent 10 and mobile node 20.

Third Embodiment

Figure 6:
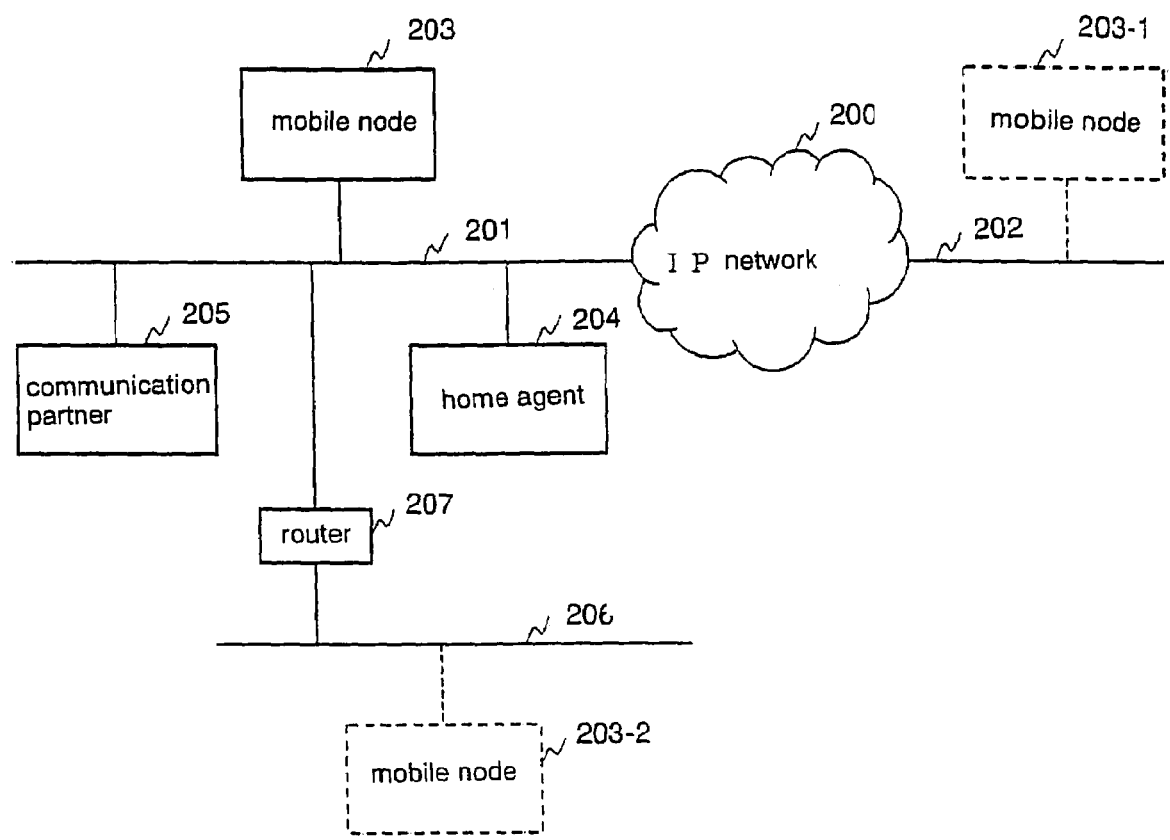
FIG. 6 is a block diagram illustrating a communication network system according to a specific example of the present invention.

Referring to FIG. 6, a communication network system according to a third embodiment is based on a network conforming to the mobile IPv6 protocol with improvements added thereto, wherein intra-network 201 and another network 202 are interconnected through IP core network 200 such as the Internet, and intra-network 201 is also connected to another intra-network 206 through router 207. Connected to intra-network 201 are mobile node 203 and associated home agent 204 as well as communication partner 205 of mobile node 203. In other words, for mobile node 203, intra-network 201 serves as a home link, and networks 202, 206 appear as foreign links. Therefore, FIG. 6 illustrates mobile node 203 connected to the home link. Assume herein that intra-network 201 and intra-network 206 are secure networks, i.e., networks free from tapping and tampering, while IP network 200 and network 202 are insecure networks.

When mobile node 203 moves from intra-network 201, which is its home link, to network 202, which is a foreign link, as indicated by broken line 203-1 in FIG. 6, network detector 22 recognizes from a router advertisement that mobile node 203 has moved to the foreign link, and acquires a new care-of address. Assume now that the care-of address most recently acquired by mobile node 203 is X:a, where X:a represents a 128-bit IPv6 address, X represents a network prefix of network 202, and a represents an interface ID of mobile node 203. Assuming that a security method, for example, "with encryption (ESP)" is set in correspondence to X in security application management table 24, security controller 23 determines a method of encrypting data using ESP for a security method for use in communications with home agent 204.

On the other hand, notified from mobile node 203 to home agent 204 through a Binding Update signal is care-of address X:a acquired in network 202 to which mobile node 203 has been most recently connected in the first embodiment, and are address X:a acquired in network 202 to which mobile node 203 has been most recently connected, and the determined security method in the second embodiment. Home agent 104 registers received care-of address X:a in an internal binding cache in correspondence to the home address of mobile node 203, and references security application management table 14 to determine the same security method (method of encrypting data using ESP) as that used by mobile node 203 as a security method for use in communications with mobile node 203 in the first embodiment, while home agent 104 determines the security method (ESP) notified from mobile node 203 as a security method for use in communications with mobile node 203 in the second embodiment.

Assume that communication partner 205 transmits a packet to mobile node 203 when mobile node 203 is connected to network 202. A higher level protocol and application program of communication partner 205 use the home address as the address of mobile node 203. Upon receipt of the packet specified to be received at the home address of mobile node 203 from a higher layer, the IP layer of communication partner 205 transmits the packet with the home address still specified to be the recipient when a care-of address corresponding to the home address is not stored in the binding cache in communication partner 205. This packet is captured by home agent 204 which adds an IPv6 header (tunneling header) to the head of the captured packet based on care-of address X:a of mobile node 203 registered in the binding cache in home agent 204. The header specifies the address of home agent 204 for a source address, and care-of address X:a of mobile node 203 for a destination address. In this event, in accordance with the determined security method, the entire packet is encrypted by ESP before it is sent out. The tunnelled packet is processed as a normal IPv6 packet after the tunnelling header is removed therefrom. Then, mobile node 203 decrypts the encrypted packet in accordance with the determined security method.

When mobile node 203 has been moved to and remains connected to insecure network 202 as described above, packets delivered from communication partner 205 to mobile node 203 are captured by home agent 204 through intra-network 201, and encrypted in home agent 204 in accordance with the previously determined security method before they are delivered to mobile node 203 through IP network 200 and network 102, thereby making it possible to ensure the security for packet data.

In the IPv6 protocol, mobile node 103 can transmit a binding update option to communication partner 205 to register a pair of the home address and care-of address X:a of mobile node 203 in the binding cache of communication partner 205, such that communication partner 205 can subsequently send packets directly to mobile node 203 using the care-of address. In this event, when mobile node 203 notifies the determined security method together in the binding update option, so that communication partner 205 uses the notified security method for encryption, thereby making it possible to ensure the security as well in subsequent communications in which home agent 204 does not intervene.

Assume next that mobile node 203 has moved to another intra-network 206 connected to intra-network 201, which serves as the home link, as indicated by broken line 203-2. In this event, network detector 22 recognizes from a router advertisement that mobile node 203 has moved to network 206, and acquires a new care-of address. Assume now that the care-of address most recently acquired by mobile node 203 is Y:a, where Y:a represents a 128-bit IPv6 address, Y represents a network prefix of network 206, and a represents an interface ID of mobile node 203. Assuming that a security method specifying "without encryption or authentication" has been set in security application management table 24 in correspondence to Y, security controller 23 determines a method which does not entail encryption or authentication for a security method for use in communications with home agent 204.

On the other hand, notified from mobile node 203 to home agent 204 through a Binding Update signal is care-of address Y:a acquired in network 206, to which mobile node 203 has been most recently connected, in the first embodiment, and are care-of address Y:a acquired in network 206, to which mobile node 203 has been most recently connected, and the determined security method in the second embodiment. Home agent 204 registers received care-of address Y:a in the local binding cache in correspondence to the home address of mobile node 203, and references security application management table 14 to determine the same security method (method which does not entail encryption or authentication) determined in mobile node 203 as a security method for use in communications with mobile node 203 in the first embodiment, while determines the security method (method which does not entail encryption or authentication) notified from mobile node 203 as the security method for use in communications with mobile node 203.

When communication partner 205 transmits a packet which specifies the home address of mobile node 203 for a destination while mobile node 203 is connected to network 206, the packet is captured by home agent 204 which adds an IPv6 header (tunneling header) to the head of the captured packet based on care-of address Y:a of mobile node 203 registered in the binding cache in home agent 204. The header specifies the address of home agent 204 for a source address, and care-of address Y:a of mobile node 203 for a destination address. In this event, in accordance with the determined security method, the packet is not encrypted or authenticated. The tunnelled packet is processed as a normal IPv6 packet after the tunnelling header is removed therefrom. In this event, mobile node 203 does not perform decryption or authentication in accordance with the determined security method.

When mobile node 203 has been moved to and remains connected to secure network 202 as described above, packets delivered from communication partner 205 to mobile node 203 are captured by home agent 204 through intra-network 201, and home agent 204 delivers the packets to mobile node 203 through IP network 200 and network 106 without encryption or authentication in accordance with the previously determined security method.

Next, as mobile node 203 returns to intra-network 201, which is its home link, network detector 22 recognizes from a router advertisement that mobile node 203 has returned to the home link. When mobile node 203 returns back to the home link, home agent 204 is notified to that effect through a Binding Update signal, and an unsolicited neighbor advertisement is multicast to all nodes associated with network 201, which is the home link of mobile node 203, such that mobile node 203 can receive by itself packets destined to its home address. Upon receipt of the Binding Update signal, home agent 204 updates the binding cache possessed therein to register that mobile node 203 resides in the home link, and stops services for capturing and transferring packets to mobile node 203. Therefore, packets transmitted from communication partner 205 to mobile node 203 are directly received by mobile node 203.

When mobile node 203 resides in the home link, packets delivered from communication partner 205 and destined to mobile node 203 are sent to mobile node 203 without passing through home agent 204. Therefore, despite the lack of encryption and authentication which would be performed when home agent 204 intervenes the communication, the security is ensured for the packet data because packet data is delivered to mobile node 203 only through intra-network 201, and any problem will not be caused by bypassing home agent 204.

While preferred embodiments of the present invention have been described using specific terms, such description is for illustrative purposes only, and it is to be understood that changes and variations may be made without departing from the spirit or scope of the following claims.

What is claimed is:

1. A method of automatically setting one of a plurality of security methods in a communication network system having a plurality of sub-networks interconnected to one another, said method comprising:

handling a mobile node having a care-of address dependent on a sub-network to which said mobile node is currently connected and a home address independent of said sub-network to which said mobile node is currently connected, at said mobile node:

detecting the sub-network to which said mobile node is currently connected;

determining the security method of said plurality of security methods corresponding to the detected sub-network from among said plurality of security methods held in a node-side security application management table to hold therein correspondences between said plurality of sub-networks and said plurality of security methods, as the security method of said plurality of security methods used for ensuring the security for user data communicated between said mobile node and a home agent associated therewith; and notifying said home agent of said sub-network to which said mobile node is connected through a mobile node network signal, and at said home agent:

receiving the mobile node network signal from said mobile node; and determining the security method of said plurality of security methods corresponding to said sub-network notified from said mobile node through the mobile node network signal from among said plurality of security methods held in an agent-side security application management table to hold therein correspondences between sub-networks connected to said mobile node managed by said home agent and said plurality of security methods, as the security method of said plurality of security methods used for ensuring the security for user data communicated between said home agent and said mobile node managed thereby.

2. A communication network system together with a plurality of sub-networks interconnected to one another, said system comprising:

a home agent which forms part of the communication network system;

at least one mobile node having a care-of address dependent on a sub-network of said plurality of sub-networks currently connected thereto and a home address independent of said sub-network of said plurality of sub-networks currently connected thereto;

an agent-side security application management table to hold therein correspondences between said sub-networks of said plurality of sub-networks currently connected to said mobile node managed by said home agent and a plurality of security methods;

mobile node network signal receiver, receiving from said mobile node a mobile node network signal which notifies said sub-network of said plurality of sub-networks to which said mobile node is currently connected; and agent-side security controller, determining a security method corresponding to said sub-network of said plurality of sub-networks notified thereto through the mobile node network signal from among said plurality of security methods held in said agent-side security application management table as the security method used for ensuring security for user data communicated between said home agent and said mobile node managed thereby, wherein said security method corresponds to a mobile-node security method determined by said mobile node via a correspondence between said sub-network of said mobile node and said mobile node in a node-side security application management table.

3. The method of claim 1, wherein the security for user data communicated between said home agent and said mobile node managed thereby is encryption.

* * * * *

UNITED STATES PATENT AND TRADEMARK OFFICE
CERTIFICATE OF CORRECTION

PATENT NO. : 7,623,666 B2
APPLICATION NO. : 10/890301
DATED : November 24, 2009
INVENTOR(S) : Motoyoshi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1138 days.

Signed and Sealed this

Fourteenth Day of December, 2010

David J. Kappos
*Director of the United States Patent and Trademark Office*